(12) United States Patent
Godsted et al.

(10) Patent No.: US 6,436,474 B2
(45) Date of Patent: Aug. 20, 2002

(54) METHOD OF CHEMICALLY COATING FASTENERS HAVING IMPROVED PENETRATION AND WITHDRAWAL RESISTANCE

(75) Inventors: Kent B. Godsted, Grayslake; Geronimo E. Lat, Ivanhoe, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/886,889

(22) Filed: Jun. 21, 2001

Related U.S. Application Data

(62) Division of application No. 09/229,792, filed on Jan. 13, 1999, now abandoned.

(51) Int. Cl.$^7$ ............................. B05D 3/02; B05D 5/00
(52) U.S. Cl. ..................... 427/318; 427/327; 427/435
(58) Field of Search .................. 427/318, 327, 427/435

(56) References Cited

U.S. PATENT DOCUMENTS

| | | | |
|---|---|---|---|
| 2,086,801 A | 7/1937 | Hayden | 148/10 |
| 2,224,659 A | 12/1940 | Stoll | 10/10 |
| 2,229,565 A | 1/1941 | Hallowell, Jr. | 85/9 |
| 2,718,485 A | 9/1955 | Smuely | 411/903 |
| 3,090,712 A | 5/1963 | Berry | 148/146 |
| 3,301,120 A | 1/1967 | Loyd | 85/1 |
| 3,344,817 A | 10/1967 | Connard | 148/12.1 |
| 3,376,780 A | 4/1968 | Tanczyn | 85/48 |
| 3,765,660 A | 10/1973 | Taylor et al. | 266/6 R |
| 3,769,103 A | 10/1973 | Wardwell et al. | 148/147 |
| 3,813,985 A * | 6/1974 | Perkins | 85/49 |
| 3,853,606 A * | 12/1974 | Parkinson | 117/128.4 |
| 3,983,304 A | 9/1976 | Sakhon | 428/460 |
| 4,021,274 A | 5/1977 | Chadwick | 148/146 |
| 4,289,006 A | 9/1981 | Hallengren | 72/38 |
| 4,295,351 A | 10/1981 | Bjorklund et al. | 72/38 |
| 4,385,081 A | 5/1983 | Keller et al. | 427/80 |
| 4,486,248 A | 12/1984 | Ackert et al. | 148/145 |
| 4,583,898 A | 4/1986 | Sygnator | 411/387 |
| 4,670,310 A | 6/1987 | Tengqvist | 427/388.4 |
| 4,690,837 A | 9/1987 | Doroszkowski et al. | 427/314 |
| 4,702,880 A | 10/1987 | Porowski et al. | 376/305 |
| 4,730,970 A | 3/1988 | Hyner et al. | 411/387 |
| 4,835,819 A | 6/1989 | Duffy et al. | 427/195 |
| 4,842,655 A | 6/1989 | Porowski et al. | 148/130 |
| 4,842,890 A | 6/1989 | Sessa et al. | 427/47 |
| 4,877,463 A | 10/1989 | Aicher et al. | 148/12 B |
| 4,964,774 A | 10/1990 | Lat | 411/903 |
| 5,033,181 A | 7/1991 | Lat et al. | 29/433 |
| 5,120,175 A | 6/1992 | Arbegast et al. | 411/501 |
| 5,149,237 A | 9/1992 | Gabriel | 411/903 |
| 5,178,903 A * | 1/1993 | Lat et al. | 427/446 |

(List continued on next page.)

FOREIGN PATENT DOCUMENTS

JP     9-13070 A  *  1/1997

OTHER PUBLICATIONS

Marketing brochure of Elco Industries, Inc., entitled "DRIL– FLEX, A New Concept In Structural Fastening", dated Feb. 1989.

*Primary Examiner*—Michael Barr
(74) *Attorney, Agent, or Firm*—Pauley Petersen Kinne & Erickson

(57) ABSTRACT

A polymer-coated metal fastener is provided which has both improved ease of drive into a substrate, and improved resistance to withdrawal from the substrate. The coated fastener is prepared by heating a metal fastener, or a portion of it, to about 400–2000° F. and cooling in an aqueous medium containing an acrylic or modified acrylic polymer. The rapid cooling causes formation of a thin yet durable polymer coating on the fastener.

19 Claims, 2 Drawing Sheets

U.S. PATENT DOCUMENTS

| | | | |
|---|---|---|---|
| 5,283,280 A * | 2/1994 | Whyte et al. | 524/559 |
| 5,302,068 A | 4/1994 | Janusz et al. | 411/402 |
| 5,403,624 A | 4/1995 | DiMaio et al. | 427/421 |
| 5,417,776 A | 5/1995 | Yoshino et al. | 148/318 |
| 5,484,244 A | 1/1996 | Glovan et al. | 411/424 |
| 5,498,659 A | 3/1996 | Esser | 524/549 |
| 5,536,582 A | 7/1996 | Prasad et al. | 428/450 |
| 5,564,876 A | 10/1996 | Lat | 411/439 |
| 5,605,423 A | 2/1997 | Janusz | 411/387 |
| 5,605,722 A | 2/1997 | Esser | 427/388.4 |
| 5,605,952 A | 2/1997 | Esser | 524/522 |
| 5,605,953 A | 2/1997 | Esser | 524/522 |
| 5,609,965 A | 3/1997 | Esser | 428/522 |
| 5,614,262 A | 3/1997 | Joesten | 427/318 |
| 5,616,367 A | 4/1997 | Spearin et al. | 427/532 |
| 5,618,372 A | 4/1997 | Erdrich et al. | 156/310 |
| 5,655,969 A | 8/1997 | Lat | 470/5 |
| 5,741,104 A | 4/1998 | Lat | 411/903 |
| 5,755,542 A | 5/1998 | Janusz et al. | 411/387 |

* cited by examiner

METHOD OF CHEMICALLY COATING FASTENERS HAVING IMPROVED PENETRATION AND WITHDRAWAL RESISTANCE

This application is a divisional patent application of and claims the benefit of priority under 35 U.S.C. 120 of application Ser. No. 09/229,792, filed Jan. 13, 1999 now abandoned. This invention relates to chemically coated fasteners having improved ease of penetration into a substrate, and improved resistance to withdrawal from the substrate. This invention also includes a process for preparing the chemically coated fasteners which is integral with a heat treating and hardening process, and does not require separate cleaning of the fasteners.

FIELD OF THE INVENTION

This invention relates to chemically coated fasteners having improved ease of penetration into a substrate, and improved resistance to withdrawal from the substrate. This invention also includes a process for preparing the chemically coated fasteners which is integral with a heat treating and hardening process, and does not require separate cleaning of the fasteners.

BACKGROUND OF THE INVENTION

Chemical coatings on objects have been employed for the purposes of protecting the objects from corrosion and imparting aesthetic properties. The coated objects can be made from metals such as steel, iron, aluminum, or the like, or from other materials such as wood, plastic or paper. U.S. Pat. No. 5,283,280, issued to Whyte, discloses a process in which an aqueous bath containing a polymer solution is heated to about 80–160° F. A metal object is heated to about 220–1700° F. and immersed in the bath, causing a polymer coating to form on the surface of the object. Examples of suitable polymer solutions include those containing water-reducible alkyd resins, acrylic polymers, urethanes, multi-functional carbodiimides, melamine formaldehyde resins, styrene-acrylic copolymers, and polyolefin waxes.

Aqueous polymer coatings useful for coating objects are also disclosed in U.S. Pat. Nos. 5,458,659; 5,605,722; 5,605,952; 5,605,953; and 5,609,965; all of which are issued to Esser. All of these patents are directed to providing protective coatings or aesthetic finishes on various substrates.

In the construction industry, there is always a need or desire for fasteners having easier penetration into wood, metal and other substrates. Fasteners such as nails, for instance, are typically driven into substrates using nail guns and other power tools. Fasteners which penetrate substrates more easily reduce the energy, and often the weight, required for a power driving tool.

There is also a need and desire in the construction industry for nails and other fasteners which remain embedded in the substrate, and do not easily retract or withdraw from the substrate. Unfortunately, fasteners which are relatively easy to drive into a substrate often tend to withdraw more easily. Fasteners which are more difficult to withdraw also tend to be more difficult to drive into the substrate. Thus, it has been relatively difficult to develop fasteners which have excellent ease of penetration as well as strong resistance to withdrawal.

SUMMARY OF THE INVENTION

The present invention is directed to an elongated fastener which has improved ease of drive into a substrate, as well as improved withdrawal resistance, and a method for coating the improved fastener which can be integrated with an in-line heat treatment and hardening process.

In accordance with the invention, an elongated metal fastener (for example, a nail) is first heated to a temperature of about 500–2000° F. An aqueous solution or mixture is prepared containing about 5–99% by weight water and about 1–95% by weight of an acrylic or modified acrylic polymer or copolymer, and/or a derivative thereof. The heated fastener is then quenched (i.e. rapidly cooled) by immersing it in the aqueous polymer solution or mixture. It is not necessary to clean the fastener (to remove oils, etc.) before heating and quenching it.

The rapid cooling of the fastener causes the formation of a substantially uniform and stable coating of the polymer on the fastener surface. When the fastener is heated to the above temperature range before quenching, and quenched using the described polymer bath, the resulting polymer coated fastener exhibits surprising and unexpected properties. Specifically, the coated fastener exhibits a combination of improved ease of drive into a wood substrate, and improved resistance to withdrawal, compared to a similar but uncoated fastener. Because no cleaning of the fastener is required, the polymer coating step can be part of an in-line process during which the fasteners are partially or totally heat treated, to effect hardening.

The coated fasteners of the invention exhibit these improved properties regardless of whether or not the fasteners are washed prior to coating. Also, the chemical coating does not inhibit the resistance welding of fasteners to one or more collation wires, to form a collated fastener assembly. This may be due to the fact that the resulting chemical coating is very thin or discontinuous (e.g. cracked) so that the electrical conductivity through the coating is not compromised.

DETAILED DESCRIPTION OF THE PRESENTLY PREFERRED EMBODIMENTS

Figure 1:
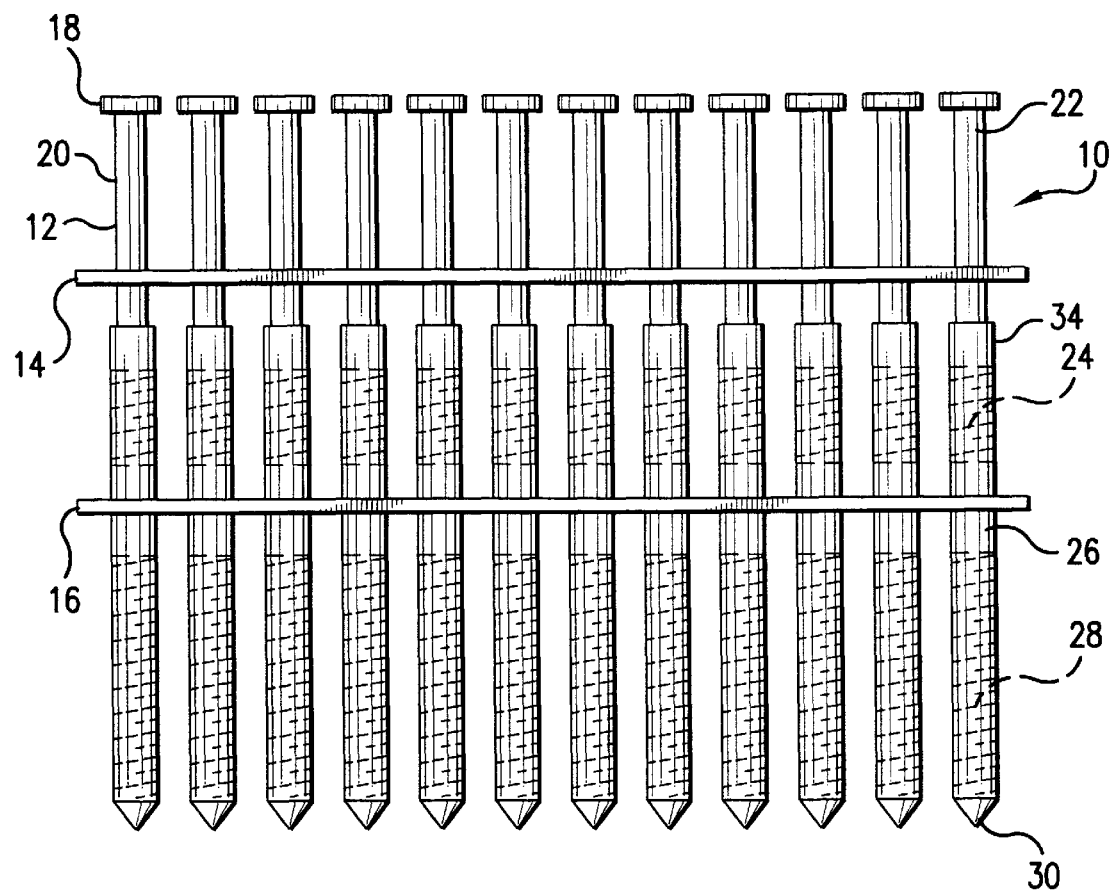
FIG. 1 illustrates a row of elongated fasteners, welded to two wires to form a collation.

Referring to FIG. 1, a collation 10 includes a row of elongated fasteners 12, which are nails, maintained in position by wires 14 and 16 which are welded to the fasteners. Each fastener 12 includes a head portion 18 and an elongated shank portion 20. Each shank 20 includes an upper smooth portion 22 adjacent the head, an upper threaded portion 24 adjacent the upper smooth portion 22, a smooth land portion 26 adjacent the upper threaded portion 24, a lower threaded portion 28 adjacent the land 26, and a pointed end 30. The invention is not limited to threaded nails, but is also applicable to smooth nails, brads, staples, corrugated fasteners, and other elongated fasteners. Alternatively, the threaded portion could extend to the head.

Depending on the end use application, and the substrate into which fasteners 12 are driven, the fasteners 12 may be constructed from suitable metals, including without limitation various alloys of carbon steel and stainless steel, aluminum, copper, bronze, nickel, and combinations thereof. For many construction applications, fasteners 12 may be constructed from carbon steel. The wires 24 and 26 may be constructed from any suitable metal which can be welded to the fasteners, including the above-listed metals and alloys.

Each of the fasteners 12 is coated with a thin polymer coating 34. Depending on the specific application, the polymer coating 34 may cover one or more select portions of each fastener 12, or the entire fastener 12. Preferably, the coating covers all portions of the fastener because this can be easily accomplished in-line by dropping a heated fastener into a quenching bath containing the polymer. In the embodiment shown, the polymer coating 34 covers the end 30, lower threaded portion 28, land 26, and upper threaded portion 24 of each fastener, and terminates in the upper smooth portion 22. As stated above, the polymer coating 34 may be discontinuous due to cracking or other separation resulting from its thinness, and/or rapid cooling during quenching.

The polymer coating 34 includes a polymer selected from the group consisting of acrylic polymers and copolymers, modified acrylic polymers, and copolymers, and derivatives and combinations of the foregoing. Suitable polymers include polymers of one or more of methyl acrylate, methyl methacrylate, ethyl acrylate, ethyl methacrylate, propyl acrylate, propyl methacrylate, butyl acrylate, butyl methacrylate, 2-ethyl hexyl acrylate, 2-ethyl hexyl methacrylate, decyl acrylate, decyl methacrylate, hydroxyethyl acrylate, hydroxyethyl methacrylate, hydroxypropyl acrylate, hydroxypropyl methacrylate, acrylonitrile, and derivatives and combinations thereof. Some suitable polymers include, without limitation, polyacrylic acid, polymethacrylic acid, polyethacrylic acid, poly-R acrylate, poly-R methacrylate, polymethyl acrylate, polymethyl methacrylate, polyethyl acrylate, polyacrylonitrile, chemically modified derivatives thereof, and combinations of any of the foregoing. Other suitable polymers are identified in the aforementioned patents to Whyte and Esser, the disclosures of which are incorporated by reference.

The polymer coating 34 should be thin and/or discontinuous enough so as not to significantly interfere with the welding of the fasteners 12 to the wires 14 and 16. In the embodiment illustrated, wire 16 must be welded to the fasteners 12 through the polymer coating 34, while wire 14 is welded to the fasteners 12 without exposure to polymer. For example, the polymer coating 32 should be thin and/or discontinuous enough that wires 14 and 16 can be welded to the fasteners using the same welding apparatus, technique and conditions.

The polymer coating 34 should have a thickness sufficient to improve both the ease of drive and the resistance to withdrawal of the fastener 12. If the coating 34 is too thick or too thin, any improvement in either the ease of drive or withdrawal resistance may be lessened or eliminated. Desirably, polymer coating 34 should have a thickness of about 0.00001 to about 0.00095 inch. Preferably, the coating thickness should be about 0.00003 to about 0.00075 inch, most preferably about 0.00004 to about 0.00060 inch.

In addition to the polymer coating type and thickness, the method of application is also important for achieving the desired end use properties. Before applying the polymer coating 34, the fasteners 12 are heated to a very high temperature. The fasteners 12 should be heated to about 400–2000° F., preferably about 500–1800° F., most preferably about 500–1700° F. If only portions of the fasteners need to be coated, then it is only necessary to heat those portions to the desired temperature. If heat treatment is employed to harden all or part of each fastener, it is highly advantageous to integrate the hardening and coating processes by using a polymer solution to cool or quench the heat treated fasteners. No intermediate cleaning of fasteners to remove oils, etc., is required.

The fasteners 12, or the specific portions of fasteners 12 requiring coating, are then quenched (rapidly cooled) using an aqueous medium containing the polymer. Preferably, the entire fasteners are cooled, because this can be conveniently accomplished by dropping the fasteners into the aqueous medium containing the polymer. The coating polymer may be present in the aqueous medium in the form of a solution, emulsion, dispersion, colloidal suspension, or other type of mixture. Preferably, the polymer is substantially homogeneously dispersed in the aqueous medium. The aqueous medium may include about 1–95% by weight of the polymer, preferably about 2–50% by weight of the polymer, most preferably about 3–25% by weight of the polymer. Dilute solutions or dispersions of the polymer are preferred, because of the need to form only a very thin polymer coating on the fasteners, and to minimize the cost of the coating material.

The temperature of the aqueous polymer medium may range from about 40–200° F., preferably about 50–150° F., more preferably about 60–120° F. If the volume of the aqueous polymer medium is large enough to prevent overheating from the fasteners being quenched, there is generally no need to otherwise heat or cool the aqueous polymer medium.

The method of application of the aqueous polymer medium to quench and coat the fasteners may depend on whether all, or only portions, of fasteners 12 are being polymer coated. Generally, the aqueous polymer medium may be applied to the fasteners by immersion, dipping, spraying, jetting, and other techniques. If the entire fastener 12 is being coated, it may be desirable to simply dip or drop each fastener into a bath containing the aqueous polymer medium. If only an upper or lower portion of each fastener is being coated, as shown in FIG. 1, it may be desirable to dip only that portion into a bath containing the aqueous polymer medium. If an isolated intermediate portion or portions are being coated, it may be desirable to use a jet or spray of the aqueous polymer medium, directed at only those portions.

Desirably, the fasteners are removed from the quench medium after a relatively short time of less than 30 seconds, preferably 3–10 seconds. Extended quench times may permit the polymer coating on the nail to redissolve in the bath. Also, removal of fasteners which are still warm facilitates drying of the coating on the fasteners.

The combination of heating of the fastener followed by rapid cooling, employing the above parameters for heating temperature and quench fluid composition, yields a polymer coating 34 which is thin yet effective. The fasteners 12 need not be previously cleaned to remove surface oils and contaminants, before coating. Regardless of whether or not the fasteners 12 are cleaned prior to coating, the coated fasteners 12 exhibit a surprising combination of improved ease of drive and resistance to withdrawal, from a wood substrate. The improved ease of drive also permits smaller diameter fasteners to be used, resulting in cost savings and further improvements in the ease of drive.

The particular substrate employed depends on the type of fastener 12 and the end use application. Particularly useful substrates include various types of wood as used in the construction industry. Other possible substrates may include metal plates, concrete beams and blocks, bricks, polymer composites, and other construction materials. The different types of fasteners which can be coated include nails, screws, hybrids such as threaded and partially threaded nails, pins, staples, brads, corrugated fasteners, and other fasteners.

Figure 2:
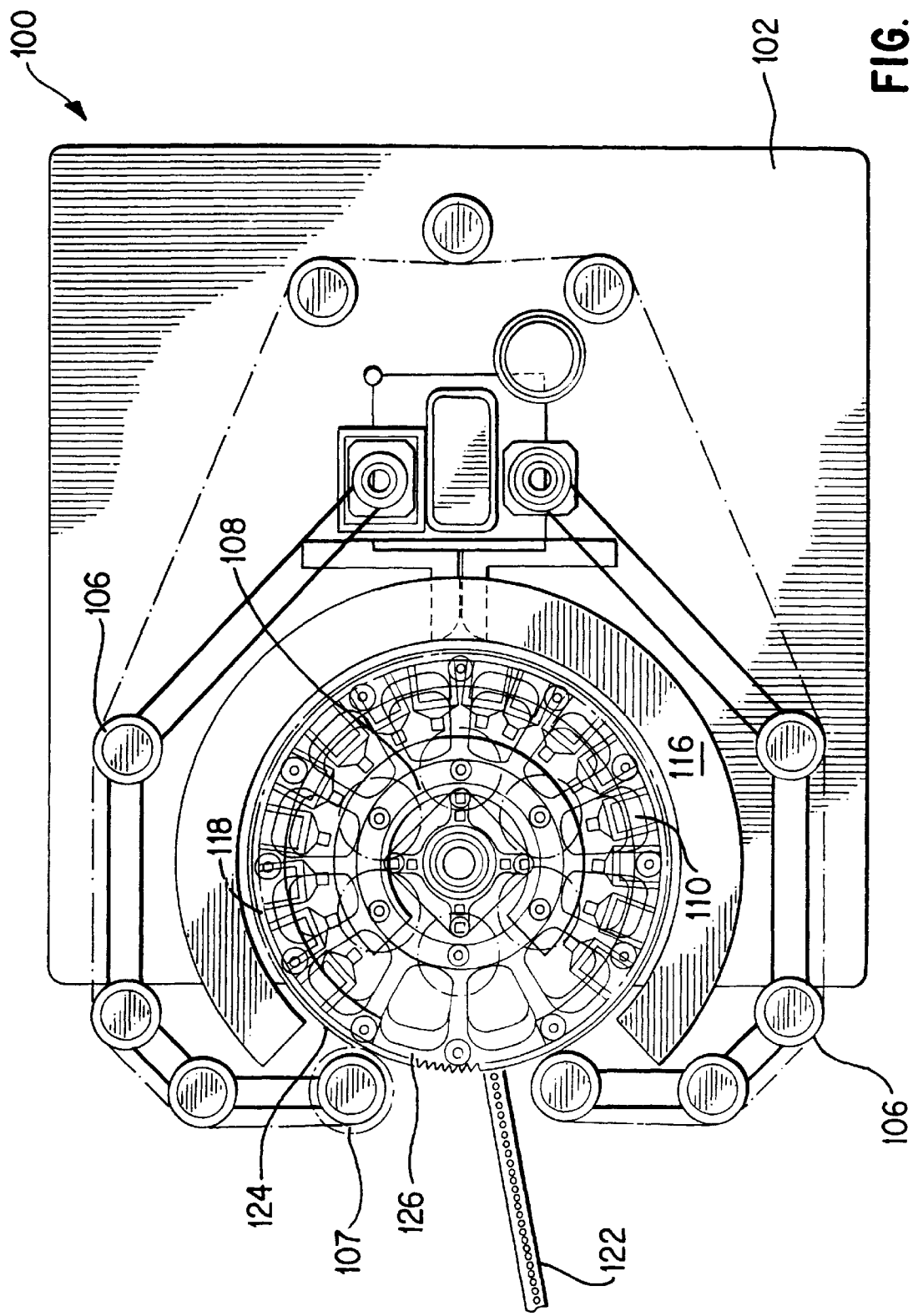
FIG. 2 is a top view of a heating apparatus for elongated fasteners.

Various techniques can also be employed for heating the fasteners 12 prior to coating with the polymer. FIG. 2 schematically illustrates an apparatus 100 useful for continuously heating a large number of fasteners such as illustrated in FIG. 1, wherein less than the entire fastener requires heating. A flammable gas from a source (not shown) enters the apparatus and is injected into a semi-circular manifold 108 located on a base 102. Firing burners 110 receive flammable gas from the manifold 108. Firing burners 110 each include a nozzle 114 which fires burning gas outward toward a semi-circular exhaust chamber 116.

A central disk 118 having a toothed outer periphery is rotated immediately above the firing burners 110. A chain 124 is located radially outward of the disk during rotation of the disk for approximately 270°. The chain 124 and outer periphery of disk 118 travel at the same speed and hold the fasteners 12 in a substantially vertical orientation in front of burners 110. When not in contact with disk 118, the chain 124 passes around a series of sprockets remote from the disk.

The fasteners 12 enter the furnace via inlet conveyor 122, whereupon they are inserted into openings between disk 118 and chain 124, and are captured between the disk and chain. As the disk 118 travels in the circular path, each of the fasteners 12 is successively exposed to, and heated by, the burners 110. After passing the last burner 110, the fasteners 12 pass to the exit chamber 126, whereupon they are ejected and quenched. In accordance with the invention, fasteners 12 are dropped into a water bath containing the polymer, so that they may be quenched and coated with polymer simultaneously in an integrated hardening and polymer coating process.

The carrier disk 118 and chain 124 may define over 100, and possibly several hundred linkage openings. Thus, the apparatus 100 may heat a large number of fasteners on a continuous basis, to very high temperatures. By varying the size and positions of the burners 110, the apparatus 100 can be used to heat select narrow portions of the fasteners, or wide portions, or substantially the entire fasteners. For example, the apparatus is useful for heating the lower portions of fasteners 12 which are then coated as shown in FIG. 1.

EXAMPLES

For the following Examples, threaded carbon steel nails having a length of 2.25 inch, a blank diameter of 0.099 inch, no lands, a blunt chisel point, a standard (flat) head configuration, and a thread diameter 10–14% over the blank diameter were employed. For each Example, the nails were heated in a forced air oven to about 850° F., and then were dropped into an aqueous polymeric quench bath for approximately three to five seconds. The coated nails were then removed from the quench bath, and the residual warmth in the nails dried the coating.

Four quench bath compositions were tested. Composition No. 1 contained one volume part water per one volume part ELMCO® Coating 59. ELMCO® Coating 59 was a developmental aqueous acrylic polymer-based composition obtained from Elmco Co. of Lafayette, Ind. Composition No. 2 contained two volume parts water per one volume part ELMCO® Coating 59. By adding water to an already dilute aqueous-based coating, the quench compositions were made sufficiently dilute to provide the desired thin polymer coating.

Composition No. 3 contained one volume part water per one volume part ELMCO® Coating 50. ELMCO® Coating 50 was a developmental aqueous modified acrylic polymer-based composition obtained from Elmco Co. The difference between Coating 59 and Coating 50 is that Coating 59 may redissolve on a coated part if the quenching residence time is too long. Coating 50 will not redissolve. Composition No. 4 contained two volume parts water per one volume part ELMCO® Coating 50.

The coated nails were initially driven into pine wood using a power driving tool at constant driving pressure, sufficient to drive the nails into the wood to a desired constant depth. For each Example, fifteen coated nails were driven into the wood, alternating with fifteen uncoated precursor "control" nails of the same type. The driven nails were tested for withdrawal resistance as follows. The head of each nail was clamped into a tensile testing machine. The nail was withdrawn at a rate of 0.10 inch per minute. A graphing mechanism and digital readout were used to monitor the varying force needed to withdraw the nail. Typically, the separating force rose to a peak and then fell, as the nail was withdrawn. The maximum force in pounds was recorded, and divided by the length of the nail originally embedded in the wood, to determine the pounds per inch withdrawal.

To measure the ease of drive, the power driving tool was set at a driving pressure insufficient to completely drive the nails of each Example, and some of the control nails, into the wood. The height of each incompletely driven nail remaining above the wood surface was measured, and subtracted from the total nail length. The resulting values represented the amount of nail length driven into the wood for each of the nails of each Example, again placed in alternating fashion with uncoated control nails.

The tests were run both for nails which had been pre-washed prior to coating to remove surface oils, and for unwashed nails. The following Table 1 summarizes the average results of the experiments.

TABLE 1

| Example No. | Coating Composition | | Withdrawal (lb/in) | | | Ease of Drive (in) | | | Coating Thickness (in) |
|---|---|---|---|---|---|---|---|---|---|
| | Washed | Unwashed | Coated Nails | Uncoated Nails | Percent Change | Coated Nails | Uncoated Nails | Percent Change | |
| 1 | 1 | | 228 | 144 | +58 | 1.64 | 1.54 | +6 | 0.00006 |
| 2 | | 1 | 189 | 113 | +63 | 1.74 | 1.53 | +14 | 0.00008 |
| 3 | 2 | | 189 | 123 | +53 | 1.63 | 1.50 | +8 | 0.00003 |
| 4 | | 2 | 163 | 97 | +68 | 1.77 | 1.67 | +6 | 0.00007 |
| 5 | 3 | | 164 | 103 | +59 | 1.58 | 1.44 | +9 | 0.00006 |
| 6 | | 3 | 189 | 121 | +56 | 1.68 | 1.52 | +10 | 0.00010 |
| 7 | 4 | | 164 | 117 | +40 | 1.69 | 1.58 | +7 | 0.00004 |
| 8 | | 4 | 164 | 117 | +40 | 1.75 | 1.69 | +5 | 0.00005 |

As shown above, the polymer coated nails in all cases had an ease of drive at lease about 5% better than the otherwise similar uncoated control nails. In some cases, the coated nails had an ease of drive at least about 10% better than the uncoated control nails.

In all cases, the polymer coated nails had a withdrawal resistance at lease about 40% greater than the uncoated nails. In most cases, the polymer coated nails had a withdrawal resistance at least about 50% greater than the uncoated nails.

To satisfy the objectives of the invention, the polymer coated fasteners of the invention should have at least about 4% better ease of drive and at least about 5% better withdrawal resistance than otherwise similar fasteners without the polymer coating preferably, the polymer coated fasteners of the invention should have at least about 5% better ease of drive and at least about 20% better withdrawal resistance than otherwise similar fasteners without the polymer coating. More preferably, the polymer coated fasteners of the invention should have at least about 25% better withdrawal resistance than otherwise similar uncoated fasteners.

The Examples further illustrate that the polymer coating process of the invention significantly improves both the withdrawal resistance and ease of drive of the fasteners, regardless of whether or not the fasteners are pre-washed to remove surface oils and dirt. In the aggregate, there was little difference in performance between washed and unwashed nails. The elimination of the washing requirement is a significant process and cost advantage.

While the embodiments of the invention disclosed herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A method of coating an elongated metal fastener to improve both the ease of drive and resistance to withdrawal from a substrate, comprising the steps of:

heating at least a portion of the elongated metal fastener to a temperature of about 400–2000° F.;

cooling at least the heated portion of the fastener using an aqueous polymer medium;

the polymer medium including about 75–97% by weight water and about a 3–25% by weight of a polymer selected from the group consisting of acrylic polymers, and combinations thereof; chemically modified acrylic polymers, and combinations thereof;

the cooling step resulting in a polymer coating covering at least the heated portion of the fastener; and drying the fastener.

2. The method of claim 1, wherein at lease the heated portion of the fastener is cooled for less than about 30 seconds.

3. The method of claim 1, wherein at lease the heated portion of the fastener is cooled for about 3–10 seconds.

4. The method of claim 1, wherein the heating temperature is about 500–1800° F.

5. The method of claim 1, wherein the heating temperature is about 500–1700° F.

6. The method of claim 1, wherein the polymer medium comprises a polymer selected from the group consisting of polymers of one or more of methyl acrylate, methyl methacrylate, ethyl acrylate, ethyl methacrylate, propyl acrylate, propyl methacrylate, butyl acrylate, butyl methacrylate, 2-ethyl hexyl acrylate, 2-ethyl hexyl methacrylate, decyl acrylate, decyl methacrylate, hydroxyethyl acrylate, hydroxyethyl methacrylate, hydroxy propyl acrylate, hydroxypropyl methacrylate, acrylonitrile, and derivatives and combinations thereof.

7. The method of claim 1, wherein the polymer medium comprises a polymer selected from the group consisting of polyacrylic acid, polymethacrylic acid, polyethacrylic acid, poly-R acrylate, poly-R methacrylate, polymethyl acrylate, polymethyl methacrylate, polyethyl acrylate, polyacrylonitrile, chemically modified derivatives thereof, and combinations of any of the foregoing.

8. A method of coating an elongated metal fastener to improve both the ease of drive and resistance to withdrawal from a substrate, comprising the steps of:

without cleaning the elongated metal fastener, heating at least a portion of the elongated metal fastener to a temperature of about 400–2000° F.;

rapidly cooling at least the heated portion of the elongated metal fastener using an aqueous polymer medium including about 75–97% by weight water and an acrylic-based polymer for a period of less than about 30 seconds;

the rapid cooling resulting in a polymer coating covering at least the heated portion of the fastener; and drying the fastener.

9. The method of claim 8, wherein the period of cooling is about 3–10 seconds.

10. The method of claim 8, wherein the elongated fastener comprises a nail.

11. The method of claim 8, wherein the elongated fastener comprises a threaded nail.

12. The method of claim 8, wherein the elongated fastener comprises a screw.

13. The method of claim 8, wherein the elongated fastener comprises a pin.

14. The method of claim 8, wherein the elongated fastener comprises a staple.

15. The method of claim 8, wherein the elongated fastener comprises a brad.

16. A method of coating an elongated metal fastener to improve both the ease of drive and resistance to withdrawal from a substrate, comprising the steps of:

without cleaning the elongated metal fastener, heating the elongated metal fastener to a temperature of about 400–2000° F.;

rapidly cooling the elongated metal fastener using an aqueous polymer medium including about 75–97% by weight water and an acrylic-based polymer for a period of less than about 30 seconds;

the rapid cooling resulting in a polymer coating having a thickness of about 0.00001 inch to about 0.00095 inch covering the fastener; and drying the fastener.

17. The method of claim 16, wherein the polymer coating has a thickness of about 0.00003 to about 0.00075 inch.

18. The method of claim 16, wherein the polymer coating has a thickness of about 0.00004 to about 0.00060.

19. The method of claim 16, wherein the period of cooling is about 3–10 seconds.

* * * * *